July 14, 1964  I. A. CAPUANO  3,140,918
CONTINUOUS CONDUCTOMETRIC ANALYSIS OF AN ALDEHYDE
Filed Sept. 14, 1960
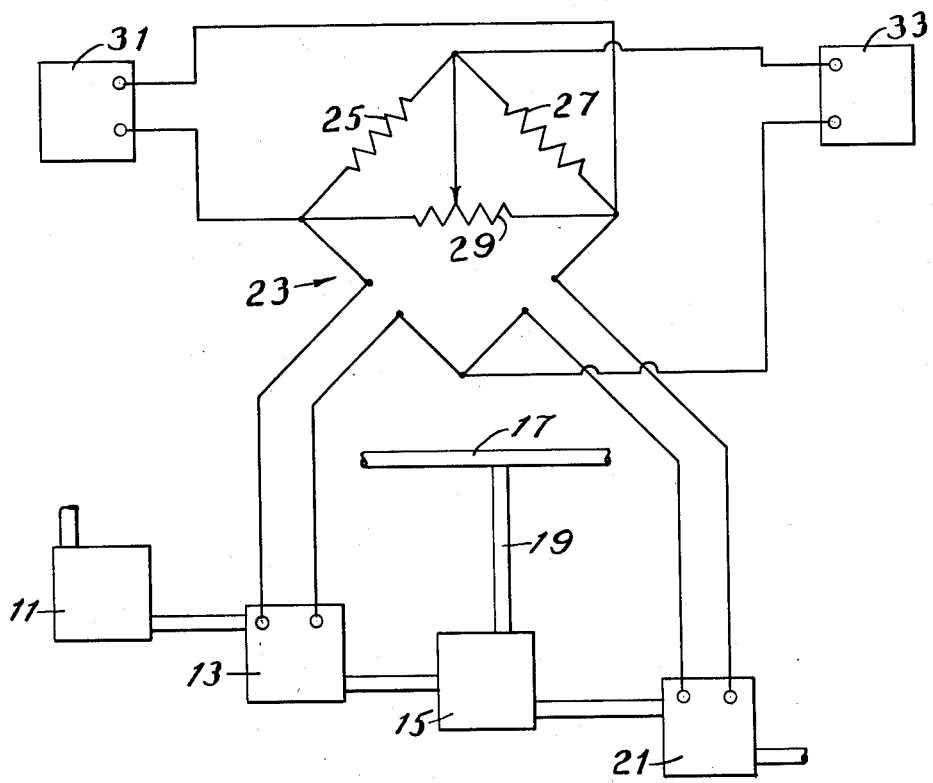
INVENTOR.
ITALO A. CAPUANO
ATTORNEY

United States Patent Office 3,140,918
Patented July 14, 1964

3,140,918
CONTINUOUS CONDUCTOMETRIC ANALYSIS
OF AN ALDEHYDE
Italo A. Capuano, St. Albans, W. Va., assignor to Union
Carbide Corporation, a corporation of New York
Filed Sept. 14, 1960, Ser. No. 55,878
4 Claims. (Cl. 23—230)

The present invention relates to a method for the analysis of liquid streams and more particularly to an improved method for precise analysis of such streams for the detection and measurement of concentration of aldehydes therein present in amounts of from a few hundreths of a percent to 1.2 percent by volume. The measurement is based on the Schiff test for aldehydes and employs the conductometric determination of sulfurous acid which is formed as one of the products of the chemical reaction incident to the Schiff test. Continuous indirect measurement of the aldehyde concentration is made through analysis of the sulfurous acid by means of a conductometric analyzer operating on a differential measurement principle.

Many experimental and industrial chemical processes require the analysis, for aldehydes, of solutions containing ketone impurities such as acetone and methyl ethyl ketone as well as other types of impurities. Presently known methods for such analysis include infrared and ultraviolet spectroscopy, various physical and chemical tests and colorimetric measurements based on the Schiff test.

Because of the similar physical and chemical properties of aldehydes and ketones, spectroscopic analysis and many of the physical and chemical analytical methods do not yield accurate results unless there is wide disparity in the respective concentrations of the aldehydes and ketones present in the solutions analyzed. In the event that a solution must be analyzed while in a continuously flowing stream, precipitates, formed in many of the physical and chemical tests, tend to clog and hinder the functioning of a continuous stream analyzer.

The Schiff test, based on an art-known chemical reaction, and commonly used in the colorimetric analysis of aldehydes, comprises the steps of reacting sulfurous acid with a basic fuchsin solution, which is an intense red color, to produce a colorless reagent known as Schiff's reagent or Schiff's base and reacting an aldehyde to be analyzed with the Schiff's reagent to form sulfurous acid and a colored compound which is then colorimetrically analyzed to determine the aldehyde concentration. The decolorization of the basic fuchsin solution appears to involve the formation of leucosulfonic acid and the addition of sulfur dioxide to two amino groups. The subsequent reaction of the colorless Schiff's reagent with an aldehyde forms an addition product which loses sulfurous acid to form the colored compound which is colorimetrically analyzed.

It has been found however, that when an aldehyde is present in concentration of 0.5%, or greater, by volume, colorimetric relationship to concentration becomes non-linear, on a logarithmic scale, with practically no change in slope beyond a 1.2% aldehyde concentration. In addition, when colorimetric analysis based on the Schiff test is used on continuously flowing streams, the continuous addition of the reagent to the flowing stream being tested frequently renders the solution passing through the measuring cell too turbid for precise colorimetric measurement.

The present invention obviates all of the aforementioned difficulties encountered in using presently known methods for aldehyde analysis of a continuously flowing liquid stream containing one or more ketones and other impurities, by providing a method whereby the analysis for an aldehyde is made by conductometric measurement of the sulfurous acid formed in the Schiff test, thus making test results independent of color, turbidity and constituency of the products of known tests.

Apparatus suitable for performing the method of the invention is shown in the drawing wherein the single figure is a combined electrical schematic diagram and a schematic flow diagram.

The method of the present invention will be described in detail hereinbelow with respect to the apparatus shown in the drawing.

A prepared quantity of Schiff's reagent is supplied continuously from reagent reservoir 11 and is caused to flow through reference conductivity cell 13 into mixing chamber 15 through suitable conduit means. A portion of a stream which is to be analyzed is diverted from a main stream conduit 17 through branch conduit 19 to mixing chamber 15, where mixing and reacting of the Schiff's reagent and the stream being tested occurs, forming sulfurous acid mixed with a colored solution. The solution containing the sulfurous acid is then passed from mixing chamber 15 through measuring conductivity cell 21, from which it is continuously drained.

Reference conductivity cell 13 and measuring conductivity cell 21 form two arms, respectively, of a conductivity bridge, indicated generally by designation 23. The reference and measuring conductivity cells may be constructed in any suitable manner, the only essential requirements being that the cells are structurally similar to each other and that the cell constants are equal. The constant of a conductivity cell is defined as the number obtained by dividing the distance between the cell electrodes by the cross-sectional area of the space bounded by the electrode conducting faces. In the preferred embodiment of apparatus for performing the method according to my invention, however, conductivity cells are employed which have transparent cell bodies to facilitate detection of foreign matter in the streams passing therethrough, controllable cell drain means to permit the removal of detected foreign matter, and cell vents to permit the escape of gas or vapor globules which may occur in solutions passing through the cells.

Conductivity bridge 23, in addition to having as two arms thereof the reference and measuring conductivity cells 13 and 21, comprises bridge impedances 25 and 27 forming, respectively, the other two arms of the bridge, and a potential divider 29, to balance the bridge. A power supply 31 is used to excite the bridge and bridge output is sensed, indicated and recorded by recorder 33.

With a stream of reagent only passing through reference cell 13, mixing chamber 15 and measuring cell 21, conductivity bridge 23 is balanced for zero output by adjustment of potential divider 29. When a sample stream containing the aldehyde is introduced into mixing chamber 15 through conduit 19, sulfurous acid is formed in a concentration proportional to the aldehyde present and the conductance of the solution passing through measuring cell 21 differs from the conductance of the reagent only, causing the impedance of measuring cell 21 to differ from that of reference cell 13. The bridge 23 becomes unbalanced and develops an output signal proportional to the impedance difference between the reference and measuring cells and hence proportional to the aldehyde concentration in the sampled stream.

In a particular embodiment, the apparatus used comprises a laboratory type A.C. conductivity bridge, having zero and range controls and connection terminals for external reference and measuring cells, excited by a 0.8 volt 60 c.p.s. regulated voltage A.C. power supply, with bridge output in circuit with a low level A.C. to D.C. rectifier and a high input impedance electronic recorder. The recorder has two selectable full scale deflection ranges of 5 millivolts and 20 millivolts. To keep measurements linear and for convenience in reading analysis data from the recorder charts, the 20 millivolt full scale deflection range is used for testing solutions having aldehyde concentrations of from 0 to 0.8 percent by volume and the 5 millivolt full scale deflection range is used for testing solutions having aldehyde concentrations of from 0.8 percent to 1.2 percent. The conductivity cells have transparent plastic bodies, inlet and outlet connections, vents, drain plugs and platinized electrodes at about one-half inch spacing. A laboratory type magnetic stirrer is used to mix and agitate the reagent and the sample in the mixing chamber and two metering pumps are used to supply constant flow of the reagent and sample streams to the analyzer apparatus. To eliminate transients and fields on the detecting circuitry, a magnetically permeable metal shield is installed on the electrical components of the apparatus. Because the mobility of most ions increases approximately 2 percent per 1° centigrade increase in temperature, the conductivity cells, the mixing chamber and connecting conduits are maintained at a constant temperature. While this temperature may be selected over a wide range, a temperature of about 35° centigrade has been found to be satisfactory.

The above-described apparatus was used in performing analyses for acetaldehyde according to my invention in the following examples.

EXAMPLE I

The Schiff's reagent for the analyses was made by dissolving 0.0789 gram of basic fuschin dye per liter of distilled water containing 52.6 ml. of sulfurous acid. The reagent was metered at a flow rate of 11.0 ml. per minute through the reference conductivity cell and then into the mixing chamber where it was reacted with an aqueous solution sample to which was added different specific amounts of acetaldehyde, introduced into the mixing chamber at a flow rate of 5.5 ml. per minute. The reacted solution was passed through the measuring cell and discharged through the measuring cell drain port. Under these conditions determinations of the acetaldehyde concentration in the sample tested according to the method of my invention were found to be as tabulated below in Table I, in the column headed "Measured."

*Table I.—Determination of Acetaldehyde by Differential Conductometric Method*

| Run No. | Acetaldehyde, percent by Volume | | Deviation |
|---|---|---|---|
| | Added | Measured | |
| 1 | 0.190 | 0.180 | −0.010 |
| 2 | 0.380 | 0.385 | +0.005 |
| 3 | 0.535 | 0.545 | +0.010 |
| 4 | 0.780 | 0.790 | +0.010 |
| 5 | 0.995 | 0.985 | −0.015 |
| Mean Deviation | | | ±0.015 |

EXAMPLE II

In order to evaluate the method of my invention for reproducibility of results, five separate analyses were made using the reagent and flow rates of Example I but adding, in each instance, equal specific amounts of acetaldehyde. The results obtained are set forth below in Table II.

*Table II.—Reproducibility of Acetaldehyde Determination by Differential Conductivity Method*

| Run No. | Acetaldehyde, percent by Volume | | Deviation |
|---|---|---|---|
| | Added | Measured | |
| 1 | 0.380 | 0.378 | −0.002 |
| 2 | 0.380 | 0.377 | −0.003 |
| 3 | 0.380 | 0.382 | +0.002 |
| 4 | 0.380 | 0.384 | +0.004 |
| 5 | 0.380 | 0.378 | −0.002 |
| Mean Deviation | | | ±0.003 |

From the foregoing examples it will be readily appreciated that the method of analysis of my invention provides a simple, accurate means for continuously analyzing process streams for acetaldehyde concentrations as well as a precise analysis method for the laboratory. Although the examples presented deal with the determination of acetaldehyde concentration, the method applied for such determination is applicable to analyses of aqueous solutions for any aldehyde in solution and other water soluble aldehydes such as formaldehyde, propionaldehyde and the like can be readily measured thereby.

Those skilled in the art will recognize that certain modifications may be made in the apparatus used in performing the method of my invention without departing from the basic concept. For example, apparatus, instrumentation and circuitry for direct rather than differential conductometric measurement may be substituted for the conductivity bridge arrangement. Such substitution requires the use of only a single conductivity cell which must be calibrated for the range of aldehyde concentrations to be determined. Also, indicating means may be provided in place of a recorder where it is not desired to obtain permanently recorded test data.

While, in the foregoing description, certain specific details and operative steps have been set forth, together with certain suggested modifications, it will be obvious that additional variation may be made in these without departing from the spirit of the present invention.

The foregoing description has been given for clearness of understanding only, and no unnecessary limitations should be understood therefrom.

What is claimed is:

1. A method for determining the concentration of an aldehyde present in a first solution, said method comprising the steps of passing Schiff reagent through a first conductometric measuring cell, developing in said first cell a first electrical signal having an amplitude proportional to electrical conductivity of said Schiff reagent, reacting said Schiff reagent after its passage through said first cell with the said first solution to form a second solution containing sulfurous acid, passing said second solution through a second conductometric measuring cell, developing in said second cell a second electrical signal having an amplitude proportional to electrical conductivity of said second solution and subtracting said first signal from said second signal to obtain a third signal having an amplitude proportional to the concentration of the sulfurous acid in said second solution and representative of the concentration of aldehyde in said first solution.

2. A method for continuous determination of concentration of an aldehyde present in a continuously flowing aqueous stream comprising the steps of passing a stream of Schiff reagent through a first conductometric measuring cell, developing in said first cell a first electrical signal having an amplitude proportional to electrical conductivity of said Schiff reagent, continuously reacting said stream of Schiff reagent after its passage through said first cell with said continuously flowing aqueous stream to form a solution in continuously flowing stream containing sulfurous acid, passing said solution through a second conductometric measuring cell, developing in said second cell a second electrical signal having an amplitude proportional to electrical conductivity of said solution and subtracting said first signal from said second signal to obtain a third signal having an amplitude proportional to the concentration of the sulfurous acid in said solution and representative of the concentration of aldehyde in said continuously flowing aqueous stream.

3. A method for determining the concentration of aldehyde present in a solution which method comprises adding a quantity of Schiff reagent to said solution, conductometrically measuring the resulting reacted solution and developing an electrical signal having an amplitude proportional to the electrical conductivity of said reacted solution in accordance with the concentration of sulfurous acid therein present after said quantity of Schiff agent has been added thereto, said signal being representative of the concentration of aldehyde in the solution.

4. A method of analysis for concentration of aldehyde present in a continuously flowing stream, which method comprises continuously adding Schiff reagent to said solution, continuously conductometrically measuring the resulting reacted stream and continuously developing an electrical signal having an amplitude proportional to the electrical conductivity of said reacted stream in accordance with the concentration of sulfurous acid therein present after said Schiff reagent has been added thereto, said signal being representative of the concentration of aldehyde in the stream.

References Cited in the file of this patent

UNITED STATES PATENTS 2,559,090   Potter _____ July 3, 1951